(12) United States Patent
Ulrich

(10) Patent No.: US 11,738,938 B2
(45) Date of Patent: Aug. 29, 2023

(54) LOUVERED SIDEWALL CARGO CONTAINER ASSEMBLY

(71) Applicant: Eric Ulrich, Jackson, WY (US)

(72) Inventor: Eric Ulrich, Jackson, WY (US)

( * ) Notice: Subject to any disclaimer, the term of this patent is extended or adjusted under 35 U.S.C. 154(b) by 63 days.

(21) Appl. No.: 17/404,016

(22) Filed: Aug. 17, 2021

(65) Prior Publication Data

US 2023/0057333 A1 Feb. 23, 2023

(51) Int. Cl.
| | |
|---|---|
| *B65D 90/02* | (2019.01) |
| *B65D 88/12* | (2006.01) |
| *B65D 90/08* | (2006.01) |
| *B62D 53/06* | (2006.01) |

(52) U.S. Cl.
CPC ........... *B65D 90/026* (2013.01); *B65D 88/12* (2013.01); *B65D 90/08* (2013.01); *B62D 53/06* (2013.01)

(58) Field of Classification Search
CPC ...... B65D 90/026; B65D 88/12; B65D 90/08; B65D 88/74; B65D 88/741; B65D 88/742; B62D 53/06; B60J 1/14; E06B 7/08; E06B 7/084; E06B 7/086; B61D 25/00
USPC ............................................. 220/1.5; 49/86.1
See application file for complete search history.

(56) References Cited

U.S. PATENT DOCUMENTS

| | | | |
|---|---|---|---|
| 3,455,419 A | 7/1969 | Miquel | |
| 3,687,186 A | 8/1972 | Paton | |
| 5,026,112 A | 6/1991 | Rice | |
| 2003/0127876 A1 | 7/2003 | Matteo | |
| 2012/0019021 A1 | 1/2012 | Alguera | |
| 2014/0361580 A1 | 12/2014 | Flynn | |
| 2018/0354712 A1* | 12/2018 | Goleczka | H02K 7/1815 |
| 2020/0284091 A1* | 9/2020 | Turner | E06B 7/096 |

* cited by examiner

*Primary Examiner* — Andrew D Perreault

(57) ABSTRACT

A louvered sidewall cargo container assembly for reducing crosswind exposure includes a cargo container, which is substantially cuboid shaped and comprises a pair of sidewalls, a front, a back, a bottom, and a roof. Each sidewall comprises a plurality of louvers. An actuator is engaged to the cargo container and is operationally engaged to each of the plurality of louvers. The actuator is positioned to selectively motivate each of the louvers between a first position a second position. In the first position, the louver is substantially perpendicular to the bottom and each of the plurality of louvers is in a closed configuration. In the second position, the louver is transverse or parallel to the bottom, extends into the cargo container, and each of the pluralities of louvers is in an open configuration. In the open configuration, the pluralities of louvers allow passage of a crosswind through the cargo container.

8 Claims, 5 Drawing Sheets

LOUVERED SIDEWALL CARGO CONTAINER ASSEMBLY

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to cargo container assemblies and more particularly pertains to a new cargo container assembly for reducing crosswind exposure. The present invention discloses a cargo container assembly comprising a cargo container, such as a semi-trailer, in which the sidewalls of the cargo container comprise a plurality of louvers, which can be closed when transporting a load and which can be opened when the cargo container is empty.

(2) Description of Related Art Including Information Disclosed Under 37 CFR 1.97 and 1.98

The prior art relates to cargo container assemblies, in particular, semi-trailers. The prior art comprises semi-trailers having sidewalls that incorporate doors or panels, which can be selectively opened or removed, respectively, to open up at least a portion of a respective sidewall for loading and unloading. What is lacking in the prior art is a semi-trailer in which the sidewalls of the semi-trailers comprise a plurality of louvers, which can be closed when transporting a load and which can be opened when the semi-trailer is empty.

(h) BRIEF SUMMARY OF THE INVENTION

An embodiment of the disclosure meets the needs presented above by generally comprising a cargo container, which is substantially cuboid shaped and comprises a pair of sidewalls, a front, a back, a bottom, and a roof. Each sidewall comprises a plurality of louvers. An actuator is engaged to the cargo container and is operationally engaged to each of the plurality of louvers. The actuator is positioned to selectively motivate each of the louvers between a first position a second position. In the first position, the louver is substantially perpendicular to the bottom and each of the plurality of louvers is in a closed configuration. In the second position, the louver is transverse or parallel to the bottom, extends into the cargo container, and each of the pluralities of louvers is in an open configuration. In the open configuration, the pluralities of louvers are configured to allow passage of a crosswind through the cargo container.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
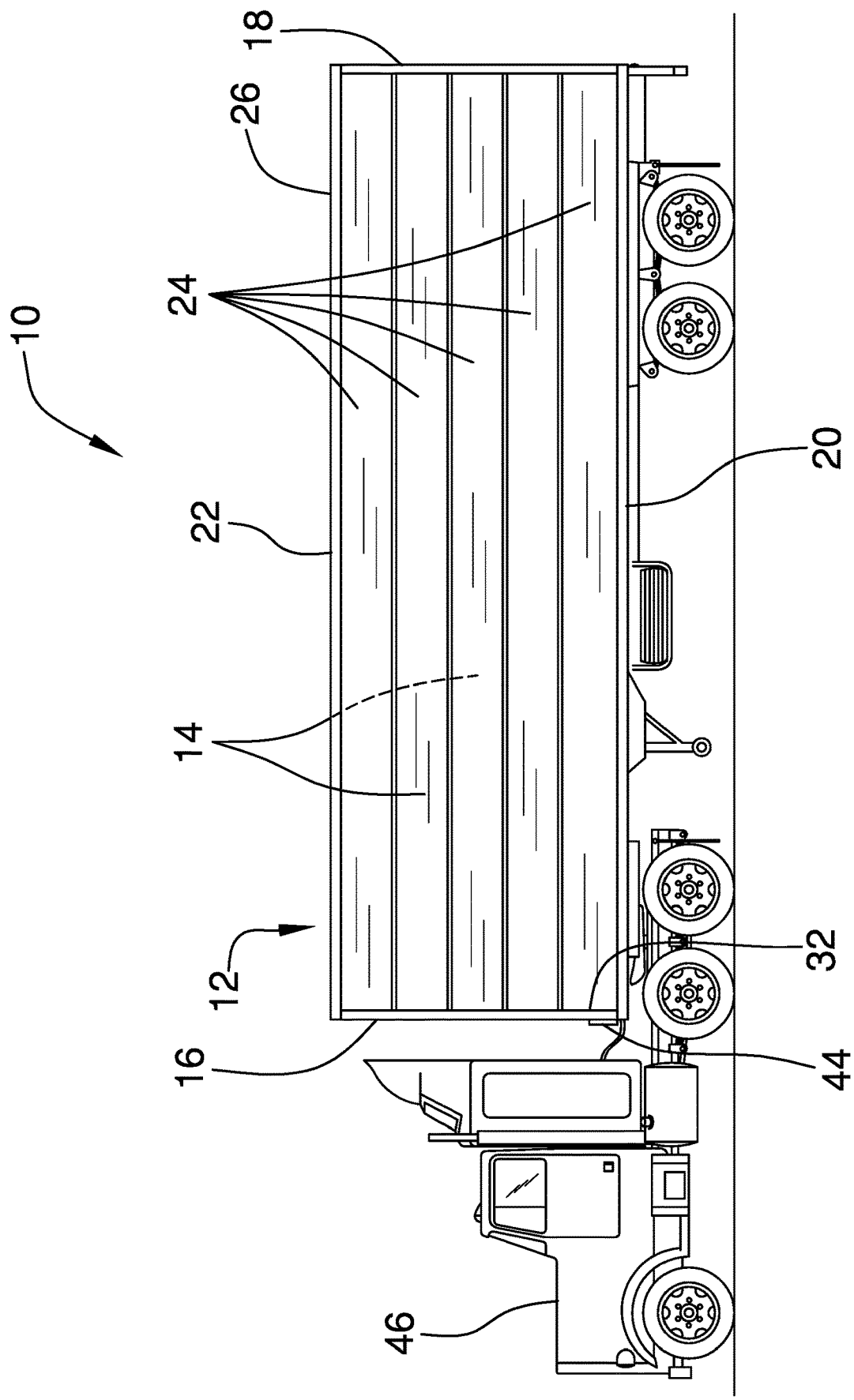
FIG. 1 is a side, closed configuration view of a louvered sidewall cargo container assembly according to an embodiment of the disclosure.

With reference now to the drawings, and in particular to FIGS. 1 through 5 thereof, a new cargo container assembly embodying the principles and concepts of an embodiment of the disclosure and generally designated by the reference numeral 10 will be described.

As best illustrated in FIGS. 1 through 5, the louvered sidewall cargo container assembly 10 generally comprises a cargo container 12, which is substantially cuboid shaped and comprises a pair of sidewalls 14, a front 16, a back 18, a bottom 20, and a roof 22. Each sidewall 14 comprises a plurality of louvers 24. The present invention also anticipates one or both of the roof 22 and the back 18 of the cargo container 12 comprising a plurality of louvers 24. The cargo container 12 comprises a semi-trailer 26, as shown in FIG. 1, an intermodal container, a box car, a panel truck, or the like.

Figure 2:
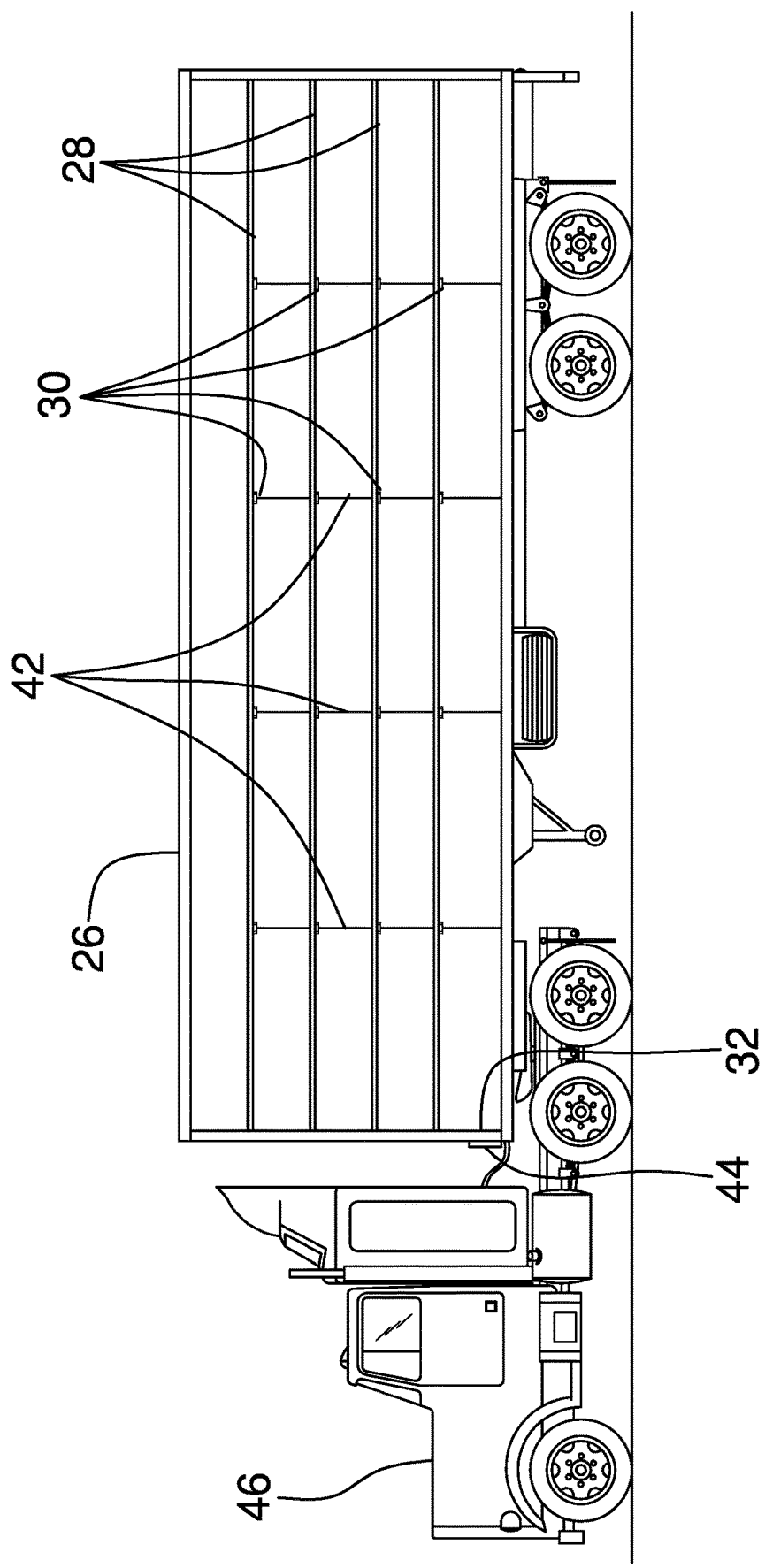
FIG. 2 is a side, open configuration view of an embodiment of the disclosure.
Figure 3:
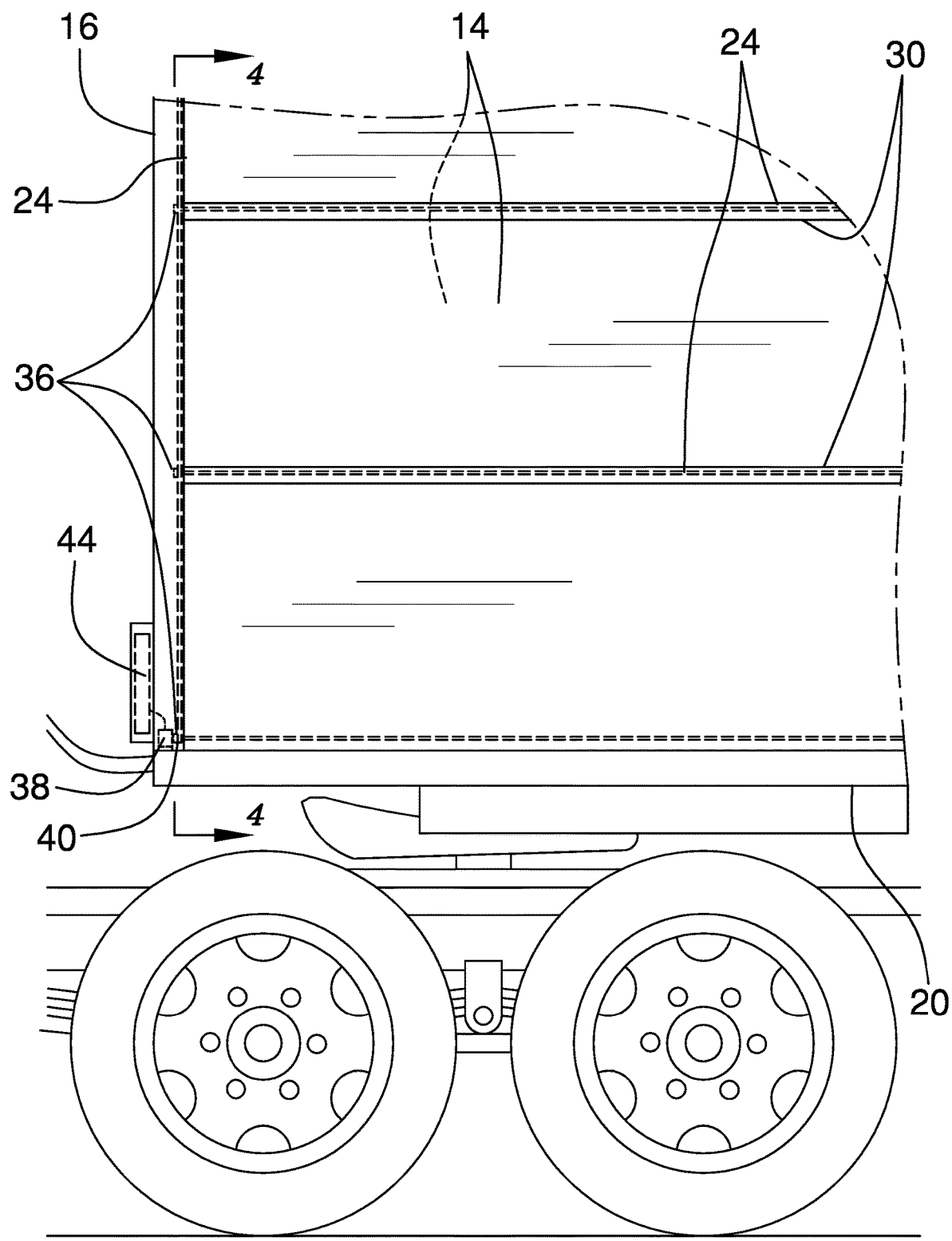
FIG. 3 is a detail view of an embodiment of the disclosure.
Figure 4:
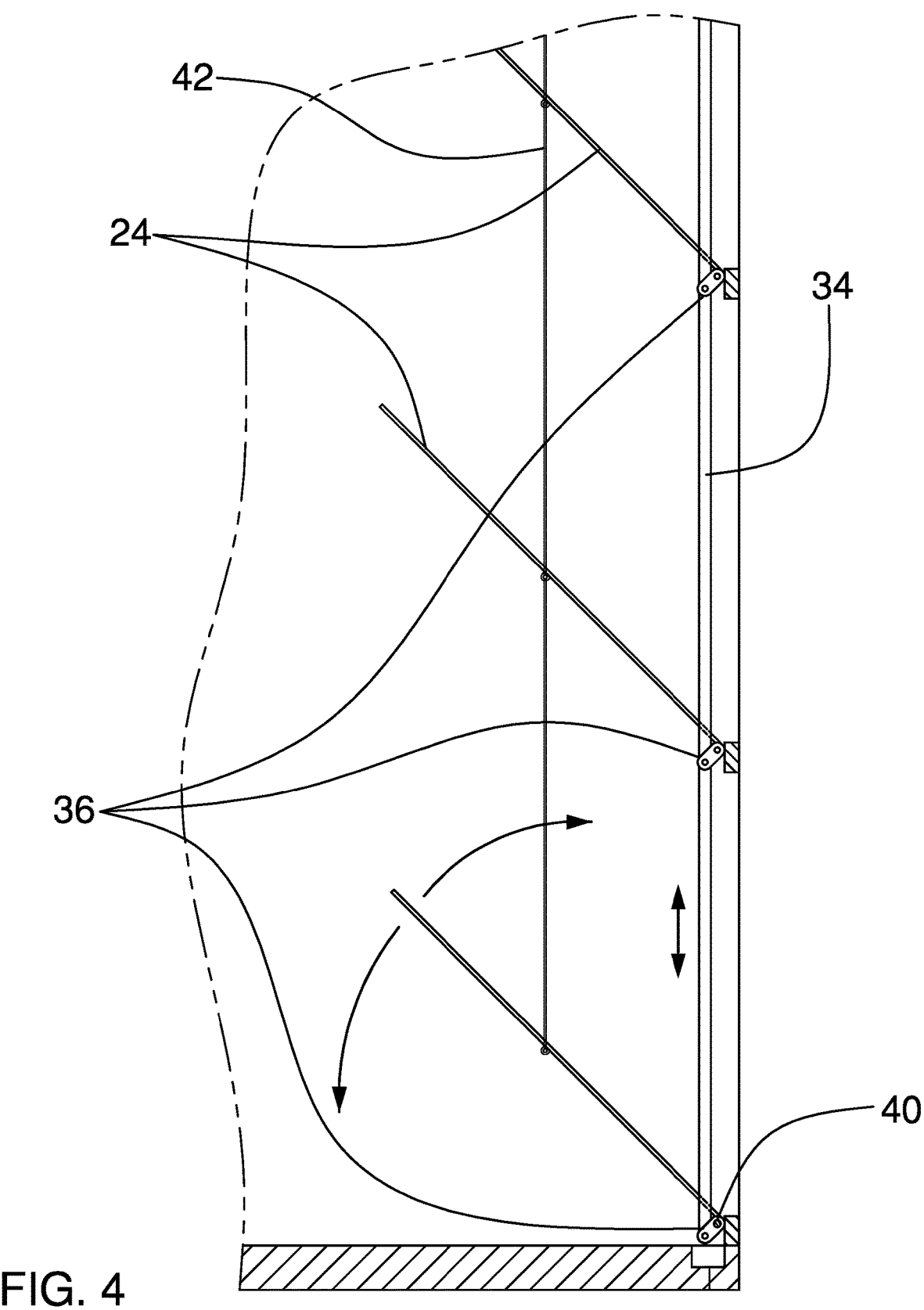
FIG. 4 is a cross-sectional view of an embodiment of the disclosure.

The louvers 24 may be substantially perpendicular to the front 16 and the back 18 of the cargo container 12, as shown in FIG. 2, although the present invention anticipates the louvers 24 being substantially perpendicular to the bottom 20 and the roof 22 of the cargo container 12. Each louver 24 may extend substantially between the front 16 and the back 18 of the cargo container 12, although the present invention anticipates compartmentalized cargo containers 12 with each compartment having opposingly positioned pluralities of louvers 24. Each plurality of louvers 24 extends substantially between the bottom 20 and the roof 22. Each plurality of louvers 24 may comprise from three to seven louvers 24, such as the five louvers 24 shown in FIG. 1.

A plurality of cross supports 28 extends between the front 16 and the back 18 of the cargo container 12. The present invention also anticipates a plurality of uprights (not shown) in addition to, or in place of, the plurality of cross supports 28. Each of a plurality of hinges 30 is engaged to and extends between a respective louver 24 and an associated cross support 28 so that each louver 24 is hingedly engaged to a respective cross support 28.

Figure 5:
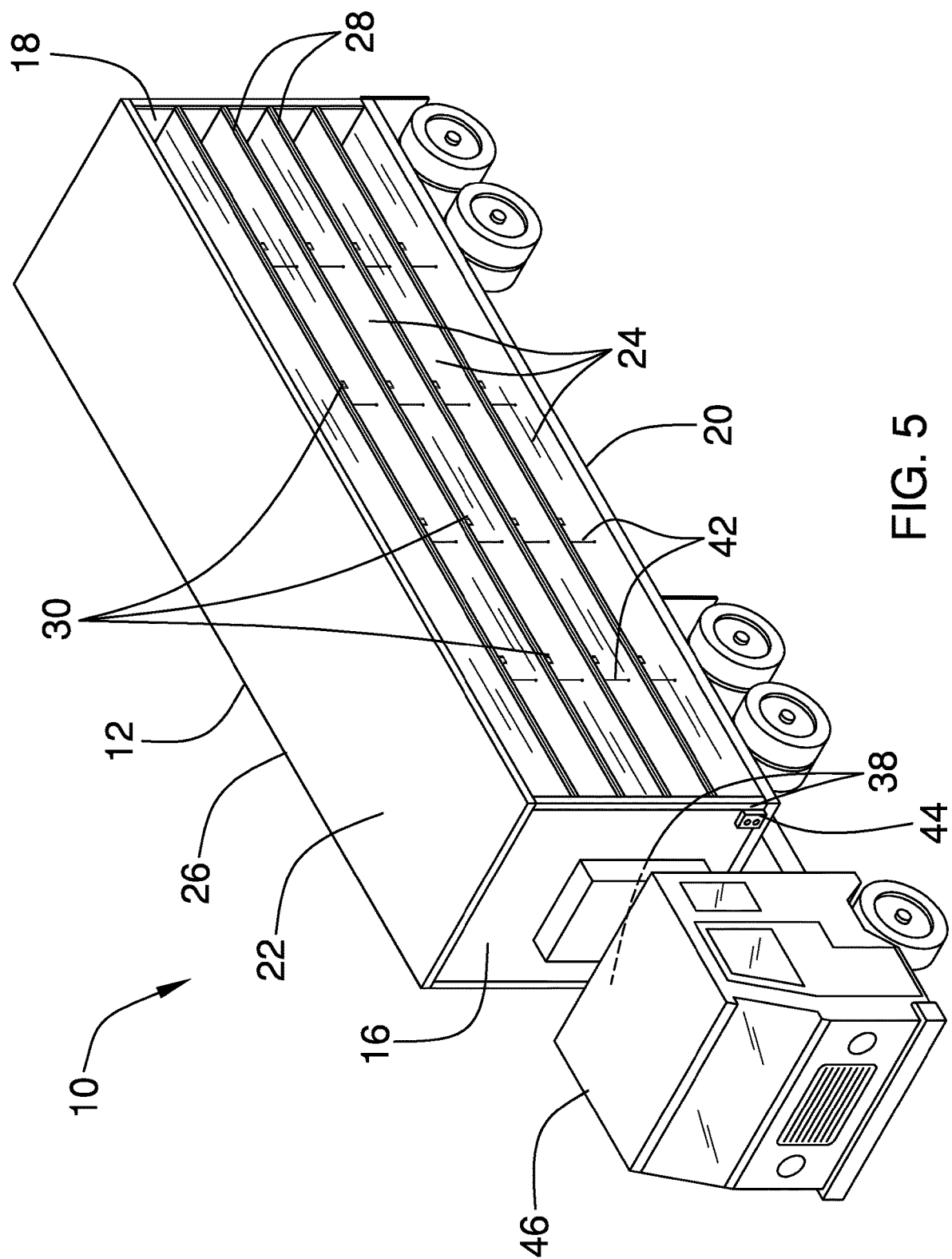
FIG. 5 is an isometric perspective view of an embodiment of the disclosure.

An actuator 32 is engaged to the cargo container 12 and is operationally engaged to each of the plurality of louvers 24. The actuator 32 is positioned to selectively motivate each of the louvers 24 between a first position a second position. In the first position, the louver 24 is substantially perpendicular to the bottom 20 and each of the plurality of louvers 24 is in a closed configuration, as shown in FIG. 1. In the second position, the louver 24 is transverse or parallel to the bottom 20, extends into the cargo container 12, and each of the pluralities of louvers 24 is in an open configuration, as shown in FIGS. 2 and 5. In the open configuration, the pluralities of louvers 24 are configured to allow passage of a crosswind through the cargo container 12.

The actuator 32 may comprise a pair of linkage bars 34, a plurality of pivot bars 36, and a pair of motors 38. Each linkage bar 34 is operationally engaged to a respective plurality of louvers 24. Each pivot bar 36 is engaged to and extends between a respective linkage bar 34 and a respective louver 24 so that each louver 24 is engaged to a respective linkage bar 34 by an associated pivot bar 36. Each motor 38 has a shaft 40 that is operationally engaged to a respective pivot bar 36 so that each linkage bar 34 is operationally engaged to a respective motor 38 through an associated pivot bar 36. The respective motor 38 is positioned to selectively rotate the associated pivot bar 36 to motivate the linkage bar 34 between the bottom 20 and the roof 22 so that an associated plurality of louvers 24 is motivated between the closed configuration and the open configuration. The present invention anticipates the actuator 32 comprising other actuating means, such as, but not limited to, linear actuating devices, hand cranks, and the like.

Each of a plurality of cables 42 is engaged to and extends between each of the louvers 24 of a respective plurality of louvers 24. The cable 42 is configured to stabilize the respective plurality of louvers 24 in the open configuration.

A controller 44 is operationally engaged to the actuator 32 and is positioned to selectively actuate the actuator 32 to motivate the pluralities of louvers 24 between the closed configuration and the open configuration. The controller 44 may comprise a variety of controlling means, such as, but not limited to, switches, dials, touch panels, and the like. The present invention also anticipates the controller 44 comprising a receiver (not shown), allowing a user to control the actuator 32 remotely, such as when driving a semi-truck 46 engaged to a semi-trailer 26.

The present invention anticipates the controller 44 being configured for independent control of the motors 38 of the pair of motors 38. Thus configured, a windward plurality of louvers 24 could be actuated so as to extend upwardly into the cargo container 12, while a leeward plurality of louvers 24 could be actuated so as to extend downwardly into the cargo container 12, thus creating a downward force on the cargo container 12 and providing enhanced stability in high crosswind environments.

In use, the pluralities of louvers 24 are maintained in the closed configuration during transport of the cargo container 12 while it is loaded. The pluralities of louvers 24 can be positioned in the open configuration while transporting the cargo container 12 when it is empty.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A louvered sidewall cargo container assembly comprising:
   a cargo container, the cargo container being substantially cuboid shaped and comprising a pair of sidewalls, a front, a back, a bottom, and a roof, each sidewall comprising a plurality of louvers;
   an actuator engaged to the cargo container and being operationally engaged to each of the plurality of louvers, such that the actuator is positioned for selectively motivating each of the louvers between a first position, wherein the louver is substantially perpendicular to the bottom and each of the plurality of louvers is in a closed configuration, and a second position wherein the louver is transverse or parallel to the bottom, extends into the cargo container, each of the pluralities of louvers is in an open configuration, and wherein the pluralities of louvers are configured for allowing passage of a crosswind through the cargo container, wherein the louvers are substantially perpendicular to the front and the back of the cargo container, wherein each louver extends substantially between the front and the back of the cargo container;
   a plurality of cross supports extending between the front and the back of the cargo container;
   a plurality of hinges, each hinge being engaged to and extending between a respective louver and an associated cross support, such that each louver is hingedly engaged to a respective cross support; and
   the actuator comprising:
      a pair of linkage bars, each linkage bar being operationally engaged to a respective plurality of louvers,
      a plurality of pivot bars, each pivot bar being engaged to and extending between a respective linkage bar and a respective louver, such that each louver is engaged to a respective linkage bar by an associated pivot bar, and a pair of motors, each motor having a shaft operationally engaged to a respective pivot bar, such that each linkage bar is operationally engaged to a respective motor through an associated pivot bar, such that the respective motor is positioned for selectively rotating the associated pivot bar for motivating the linkage bar between the bottom and the roof, such that an associated plurality of louvers is motivated between the closed configuration and the open configuration.

2. The louvered sidewall cargo container assembly of claim 1, wherein each plurality of louvers extends substantially between the bottom and the roof.

3. The louvered sidewall cargo container assembly of claim 1, wherein each plurality of louvers comprises from three to seven louvers.

4. The louvered sidewall cargo container assembly of claim 3, wherein each plurality of louvers comprises five louvers.

5. The louvered sidewall cargo container assembly of claim 1, wherein the cargo container comprises a semi-trailer, an intermodal container, a box car, or a panel truck.

6. The louvered sidewall cargo container assembly of claim 1, further including a plurality of cables, each cable being engaged to and extending between each of the louvers of a respective plurality of louvers, wherein the cable is configured for stabilizing the respective plurality of louvers in the open configuration.

7. The louvered sidewall cargo container assembly of claim 1, further including a controller operationally engaged to the actuator, such that the controller is positioned for selectively actuating the actuator for motivating the pluralities of louvers between the closed configuration and the open configuration.

8. A louvered sidewall cargo container assembly comprising:
  a cargo container, the cargo container being substantially cuboid shaped and comprising a pair of sidewalls, a front, a back, a bottom, and a roof, each sidewall comprising a plurality of louvers, the louvers being substantially perpendicular to the front and the back of the cargo container, each louver extending substantially between the front and the back of the cargo container, each plurality of louvers extending substantially between the bottom and the roof, each plurality of louvers comprising from three to seven louvers, each plurality of louvers comprising five louvers, the cargo container comprising a semi-trailer, an intermodal container, a box car, or a panel truck;
  a plurality of cross supports extending between the front and the back of the cargo container;
  a plurality of hinges, each hinge being engaged to and extending between a respective louver and an associated cross support, such that each louver is hingedly engaged to a respective cross support;
  an actuator engaged to the cargo container and being operationally engaged to each of the plurality of louvers, such that the actuator is positioned for selectively motivating each of the louvers between a first position, wherein the louver is substantially perpendicular to the bottom and each of the plurality of louvers is in a closed configuration, and a second position wherein the louver is transverse or parallel to the bottom, extends into the cargo container, each of the pluralities of louvers is in an open configuration, and wherein the pluralities of louvers are configured for allowing passage of a crosswind through the cargo container, the actuator comprising:
    a pair of linkage bars, each linkage bar being operationally engaged to a respective plurality of louvers,
    a plurality of pivot bars, each pivot bar being engaged to and extending between a respective linkage bar and a respective louver, such that each louver is engaged to a respective linkage bar by an associated pivot bar, and
    a pair of motors, each motor having a shaft operationally engaged to a respective pivot bar, such that each linkage bar is operationally engaged to a respective motor through an associated pivot bar, such that the respective motor is positioned for selectively rotating the associated pivot bar for motivating the linkage bar between the bottom and the roof, such that an associated plurality of louvers is motivated between the closed configuration and the open configuration;
  a plurality of cables, each cable being engaged to and extending between each of the louvers of a respective plurality of louvers, wherein the cable is configured for stabilizing the respective plurality of louvers in the open configuration; and
  a controller operationally engaged to the actuator, such that the controller is positioned for selectively actuating the actuator for motivating the pluralities of louvers between the closed configuration and the open configuration.

* * * * *